Sept. 16, 1952  R. K. HUNTER  2,610,909
CATALYTIC APPARATUS
Filed Feb. 2, 1950
FIG. 1
FIG. 2
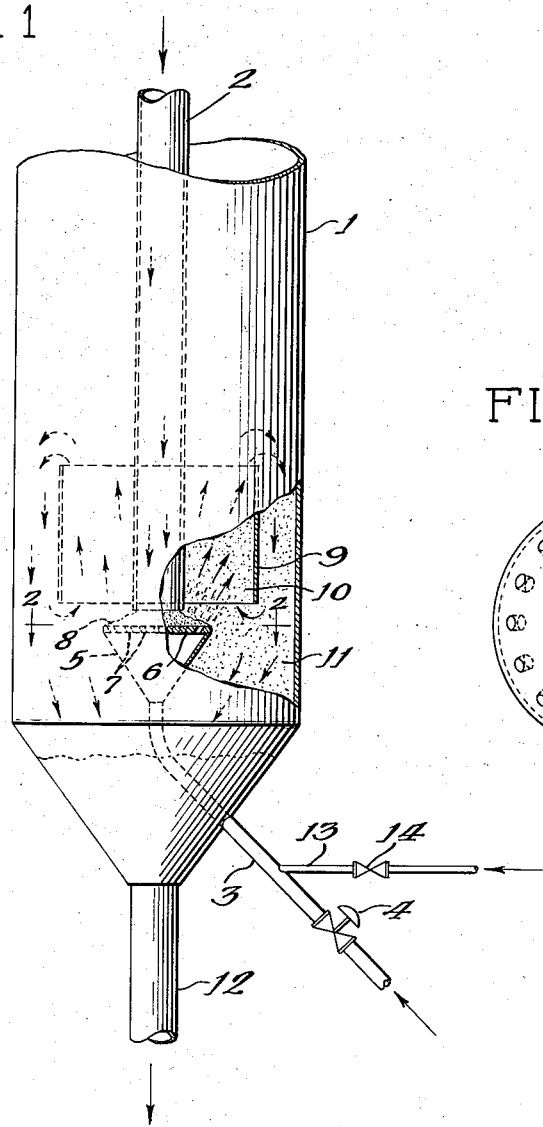
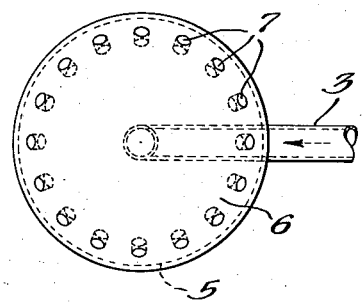
Inventor:
Robert K. Hunter
By: Chester J. Giuliani
Attorney
Philip T. Liggett
Agent Patented Sept. 16, 1952

2,610,909

UNITED STATES PATENT OFFICE 2,610,909

CATALYTIC APPARATUS

Robert K. Hunter, Oak Park, Ill., assignor to Universal Oil Products Company, Chicago, Ill., a corporation of Delaware Application February 2, 1950, Serial No. 142,052

3 Claims. (Cl. 23—288)

This invention relates to an improved method and means for introducing subdivided particles, such as catalyst, into a contacting chamber, and more particularly for effecting both the continuous introduction of particles into a contacting chamber and a fluidized contacting of the particles with a gasiform reactant stream.

In moving bed and fluidized particle operations, where subdivided or finely divided solid material is transferred from one contacting zone to another, such as in the catalytic cracking of hydrocarbons, it is desirable to maintain continuous uniform flow or movement of the particulated material so that efficient contacting is effected and desired products obtained. Fluidized contacting is of particular advantage in that there is a turbulent contacting between the fluidizing stream and the particles, with a resulting efficient production of desired reaction products within a minimum contacting time. The present operation and apparatus means is particularly directed to the control and regulation of flow of particle form material into a contacting chamber, where the solid material is transferred by gravity flow from one chamber to another. The operation, of course, is not limited to the transfer of any particular type of material, for the particles may be catalytic, adsorptive, or of a substantially inert nature.

It is a principal object of the present invention to provide a method and means for the continuous introduction of subdivided particles into a contacting chamber, in a manner whereby the gravity flow of material to the chamber is controlled or regulated without the use of valves or other mechanically operated means.

It is also an object of the present invention to provide for the controlled introduction of subdivided particles into the contacting chamber and in combination therewith, an efficient fluidized contacting of the particles.

A still further object of the invention is to provide for the introduction of subdivided particles into a contacting chamber whereby the reactant stream is jetted into the chamber and into contact with the particles to effect a regulated introduction of the particles, a fluidized contacting of the particles, and in addition recirculation of subdivided particles within the fluidized zone of the contacting chamber, with a resulting efficient turbulent contacting thereof and an efficient conversion operation.

Briefly, the present improved method of introducing subdivided particles into a confined contacting zone, comprises, passing the subdivided particles continuously downwardly in a confined compact column and discharging them on to an accumulation of particles, with the accumulation of particles being maintained horizontally below and closely adjacent the descending column and effecting a throttling of the downward flow of particles, passing a regulated fluid stream angularly upwardly around the accumulation of particles in a plurality of jet-like streams, entraining the subdivided particles from the accumulation thereof and thereby effecting a fluidized contacting simultaneously with the controlled withdrawal of particles from the descending confined column of particles, the jet streams and entrained particles passing upwardly in a fluidized flow through a confined annular zone circumscribing the lower portion of the confined descending column of particles, and subsequently permitting entrained particles to settle in a gravity descent into the lower portion of the contacting zone.

In a preferable apparatus arrangement, the particle inlet conduit extends downwardly into the interior of the contacting chamber and a fluid inlet conduit extends into the interior of the chamber to a point directly below the particle inlet conduit, with the fluid conduit terminating in distribution means having a plurality of orifices directed angularly upwardly and outwardly around the edge of a flat horizontal plate which in turn is positioned directly a short distance below the particle inlet conduit. Thus, in operation the plate member provides for an accumulation of subdivided particles from the downwardly extending particle inlet conduit and serves to retard or throttle the gravity flow of particles from that conduit member, while the plurality of jet streams from the orifices of the fluid distributing means continuously withdraw and entrain particles from the edge of the accumulation of particles and pass them up in a fluidized manner.

A relative simple and desirable apparatus embodiment provides an inverted conically shaped fluid distributing head at the end of the fluid conduit, with a flat plate member extending across the conically shaped outlet head, to provide an accumulation surface for the particles descending through the inlet conduit. The flat plate member may in turn have a plurality of holes or orifices placed at an angle around the periphery thereof, to in turn provide for the plurality of jet streams of the reactant fluid being introduced through the inlet conduit. The upwardly projecting jet streams of reactant fluid may then, as hereinbefore described, entrain particles from the accumulation and regulate the withdrawal of subdivided material from the inlet conduit and at the same time entrain the particles in a fluidized upward flow to effect a turbulent contacting between the reactant stream and subdivided particles.

It is a still further feature of the present arrangement and method of contacting, to utilize a cylindrically shaped baffle plate spaced from and placed concentrically around the particle inlet conduit, as well as fluid inlet distributing head, in order to provide two concentric annular shaped zones within the contacting chamber. The entrained and fluidized particles from the accumulation on the plate at the fluid inlet head are carried upwardly through the inner annular section or zone formed by the cylindrical baffle plate, in a turbulent fluidized contacting operation. At the top of the cylindrical baffle, within the enlarged area, the entrained particles lose velocity and tend to settle within the annular zone on the outside of the cylindrical baffle and thus pass downwardly between the baffle and the inner wall of the contacting chamber. A major portion of the particles settle into the lower portion of the contacting chamber for withdrawal therefrom, however, a portion of the particles may be recirculated from below the lower edge of the cylindrical baffle and pass upwardly with the jet streams and entrained particles, and thus against contact the reactant stream within the inner annular contacting zone. The length of the cylindrical baffle, the angular position of the plurality of jet streams of reactant fluid, and the velocity of the jet streams, may be varied to affect the amount of recirculation in the particle contacting zone. The placement of the orifices for the jet streams, as well as the size of the streams and velocity of fluid, also affect the rate of entrainment and withdrawal of subdivided particles from the particle inlet conduit.

In a usual moving bed operation, wherein the subdivided contacting material descends in a gravity flow through one or more contacting chambers, it is usually necessary to maintain a considerable depth of bed and considerable contacting period between the reactant stream and the moving bed of particles, in order to insure the uniform and thorough contacting between the fluid stream and the contact material. It is, therefore, of particular advantage in the present operation to make use of a fluidized zone for rapid and turbulent contacting of the solid particles, such that an efficient conversion is effected, and as a result the contacting chamber may be reduced in size to in turn effect a substantial reduction in the initial cost of the particular processing plant.

It is also an advantage to utilize the reactant stream which is to contact the subdivided particles within the given chamber, to control or regulate the rate of introduction of subdivided particles into the contacting chamber, such that mechanical feed means, valves, or the like may be eliminated, and the subdivided particles allowed to descend through unobstructed standpipes or substantially vertically positioned transfer conduits.

The method and means for introducing particles into the contacting chamber may be more readily understood upon reference to the accompanying drawing and the following description thereof.

Figure 1 of the drawing indicating diagrammatically a partial elevational view of a particle contacting chamber and its internal means for effecting the introduction of the subdivided particles.

Figure 2 of the drawing is a plan view of the fluid distributing head within the contacting chamber, as indicated by the line 2—2 in Figure 1 of the drawing.

Referring now to the drawing, there is indicated a contacting chamber 1 having a vertically disposed particle inlet conduit 2 projecting downwardly into the interior thereof. The conduit 2 being suitable to transfer subdivided solid contact material from a supply source or from another contacting chamber, with the material descending by gravity flow in a substantially compact column of particles. A fluid contacting or reactant stream is introduced into the contacting chamber 1 by way of a conduit 3 and control valve 4, with the conduit terminating in an enlarged fluid distributing head 5. The distributing head in this embodiment is conically shaped and has a flat plate 6 extending across the flared or enlarged end of the head 5. The plate 6 has an imperforate center section and is spaced but a short distance below the lower end of the particle inlet conduit 2 as well as placed symmetrically therewith, such that the particles descending by gravity through the conduit 2 may accumulate on the upper surface of plate 6 to effect a retardation or throttling of the flow of particles. A plurality of orifices 7 are positioned around the edge or periphery of the horizontal plate 6 such that the fluid medium entering conduit 3 is distributed in a plurality of jet-like streams to in turn entrain the subdivided particles from the accumulation thereof, as indicated by the numeral 8, maintained between the upper surface of the plate 6 and the lower end of the conduit 2.

In a preferable apparatus arrangement, the plurality of orifices 7 are directed angularly upwardly and outwardly with respect to the fluid distributing nozzle 5 so that the particles are entrained from the lower or outer edge of the accumulation of particles 8, to be projected upwardly against the inner wall of the cylindrical baffle 9 and within the confined annular zone 10, formed by the baffle 9 which encompasses the lower end of the inlet conduit 2. The height of the baffle 9 may be varied to suit the desired conversion conditions between the subdivided particles and the fluidizing reactant stream, providing a fluidized contacting zone, where the particles pass concurrently upwardly with the reactant stream. The enlarged cross-sectional area of the chamber 1 at a point above the upper edge of the baffle 9 effects a lower velocity gaseous or vaporous flow and the subdivided particles descend in a gravity flow or by settling through the annular zone 11, maintained between the baffle 9 and the inner wall of the chamber 1. The descending particles from zone 11 pass to the lower portion of the chamber 1 for accumulation in the lower portion thereof and for subsequent transfer through outlet conduit 12. However, in accordance with one feature of the present operation, the cylindrical baffle 9 is positioned and arranged to control the flow of the subdivided material such that at least a portion of the particles may be recirculated upwardly through the fluidized contacting zone 10. In other words, the lower periphery of the baffle 9 may be placed with respect to the orifices 7 and the fluid distributing head 5 such that the action of the jet-like fluid streams issuing from the orifices will draw in and entrain some of the particles descending through the outer annular section 11 and thus carry them upwardly for recontacting with the fluid reactant stream.

It may also be pointed out, that the plate 6 may be placed or positioned at varying distances from the lower end of the inlet conduit 2, or alternatively, may have a varying diameter, so as to regulate the amount of particle accumulation thereon. While in addition, the number of orifices 7 and the flow rate of the reactant stream may be varied to regulate the entrainment of particles which are being withdrawn from the inlet conduit 2. In a given apparatus, the spacing of the plate 6 from the end of the inlet conduit and its diameter will be fixed to accommodate a particular type of subdivided material having a given angle of repose as it flows from a substantially vertical inlet conduit. High nozzle velocities for the jet streams issuing from the plurality of orifices 7 provide a substantially low pressure area at each side thereof so that, as hereinbefore noted, there is entrainment of particles from the accumulation 8 and a suction or Venturi effect which entrains particles from below the lower edge of the circular baffle 9 and which have descended through the outer annular zone 11.

While this particular method and means for introducing particles to a contacting chamber is particularly adaptable for the conversion of reactant streams in the presence of catalyst particles, it is not intended to limit the operation to the use of only subdivided or finely divided catalyst material.

In catalytic operations, the present method of introducing and contacting the subdivided catalyst particles may well be used in the reaction zone for the conversion of desired products, or alternatively within a regeneration zone where carbonaceous deposit is burned and removed from the catalyst particles by contact with an oxygen-containing stream. The present operation and arrangement is particularly desirable for regenerating vessels in that normally relatively large regeneration zones may be reduced in size through the use of the fluidized turbulent contacting effected within a relatively small compact zone. A gaseous diluent medium may be mixed with the oxygen or air stream if it is desirable to vary the rate of fluid introduced into the contacting zone without substantially changing the oxygen content and a desired rate of burning of carbonaceous matter from the particles. The diluent stream may be introduced to conduit 3 by way of line 13 and control valve 14.

The present angularly positioned orifices 7 are drilled or otherwise positioned to project the jet streams of the fluid medium toward a midpoint of the baffle 9 so as to insure the upward entrainment of all particles through the inner annular zone 10. The placement and number of orifices indicated in the drawing is of course not limiting, for obviously a greater or lesser number of orifices may well be used, or alternatively various types of nozzles or small conduits may well be used in place of the drilled orifices to provide the plurality of jet streams around the edge of the flat accumulation plate 6.

I claim as my invention:

1. Apparatus for introducing subdivided particles into a confined contacting chamber, which comprises in combination, a particle inlet conduit extending downwardly into said chamber, a fluid inlet conduit extending into said chamber and having a fluid distributing means positioned a short distance directly below the end of said particle inlet conduit, a cylindrically shaped baffle spaced from and encircling the lower end of said particle inlet conduit forming an inner fluidized contacting section and an outer particle settling section, said distributing means at the end of said fluid inlet conduit comprising a horizontal plate having a flat imperforate portion beneath the lower end of said particle inlet conduit and a plurality of orifices directed upwardly and outwardly from the periphery of said horizontal plate and fluid distributing means toward an intermediate portion of said cylindrical baffle, with said plurality of jet orifices effective in entraining particles from the accumulation thereof on said horizontal plate and carrying them in a fluidized flow upwardly through said inner fluidized contacting section prior to passing downwardly through said outer annular settling zone.

2. Apparatus for introducing subdivided solid particles into a confined contacting chamber, which comprises in combination, a particle inlet conduit extending downwardly into said chamber, a fluid inlet conduit extending into said chamber and discharging through a fluid outlet nozzle positioned a short distance directly below said particle inlet conduit, said fluid outlet nozzle having a flared cone-like shape and a plurality of orifices at the periphery thereof with a flat plate having an imperforate central portion positioned directly below said particle inlet conduit permitting the accumulation of particles and a throttling of particle flow from said conduit, said plurality of orifices from said nozzle directed upwardly and outwardly symmetrically therefrom whereby to effect the entrainment of subdivided particles from the accumulation on said flat plate and the continuous regulated withdrawal of particles from said particle inlet conduit, cylindrical baffle means spaced from and encircling the lower end of said particle inlet conduit forming thereby an inner annular open-ended fluidized contacting zone and an outer particle settling zone communicating with the lower portion of said contacting chamber, said fluid outlet nozzle being of lesser cross-sectional area than said cylindrical shaped baffle, whereby said plurality of jet streams entrain the subdivided particles upwardly through the inner annular fluidized contacting section, prior to reaching the enlarged cross-sectional area of said contacting chamber above said cylindrical baffle and a subsequent settlement through said outer annular zone into the lower portion of said chamber.

3. The apparatus of claim 2 further characterized in that the lower end of said cylindrical baffle is elevated with respect to said fluid outlet nozzle and orifices such that a portion of said subdivided particles descending through said outer annular settling section are entrained with said jet streams and particles passing upwardly through said inner annular fluidized contacting section, whereby to recycle subdivided particles therethrough.

ROBERT K. HUNTER.

REFERENCES CITED

The following references are of record in the file of this patent:

UNITED STATES PATENTS

| Number | Name | Date |
| --- | --- | --- |
| 2,218,078 | Flugel | May 24, 1938 |
| 2,367,351 | Hemminger | Jan. 16, 1945 |
| 2,379,734 | Martin | July 3, 1945 |